US006753501B1

United States Patent
Costin, Sr. et al.

(10) Patent No.: US 6,753,501 B1
(45) Date of Patent: Jun. 22, 2004

(54) PROCESSING OF TEXTILE MATERIALS USING LASER BEAMS AND MATERIAL SIZED IN LARGER WIDTHS

(76) Inventors: Darryl Costin, Sr., 29261 Notingham Ct., Westlake Village, OH (US) 44145;
Darryl Costin, Jr., 29261 Notingham Ct., Westlake Village, OH (US) 44145

(*) Notice: Subject to any disclaimer, the term of this patent is extended or adjusted under 35 U.S.C. 154(b) by 24 days.

(21) Appl. No.: 10/065,605

(22) Filed: Nov. 1, 2002

Related U.S. Application Data

(60) Provisional application No. 60/338,488, filed on Nov. 3, 2001.

(51) Int. Cl.[7] ............................................... B23K 26/00
(52) U.S. Cl. ................................................. 219/121.82
(58) Field of Search ...................... 219/121.6, 121.67, 219/121.68, 121.69, 121.72, 121.78, 121.79, 121.8, 121.81, 121.85, 121.82

(56) References Cited

U.S. PATENT DOCUMENTS 5,567,207 A * 10/1996 Lockman et al. ............... 8/444

* cited by examiner

Primary Examiner—Samuel M. Heinrich

(57) ABSTRACT

60-inch-TL-SCH2660-Inch-TL-SCHTechniques of writing information onto a material Web of at least 50 inches in width. The entire material web is written at once. The material written by a continuous scanning technique in which the web continuously moves and the laser writes on the moving web. In an alternative embodiment, the web stops and goes. The web may be formed horizontally in which case the rolls form a horizontal line between them. In another embodiment, the rolls form a vertical line.

48 Claims, 8 Drawing Sheets

PROCESSING OF TEXTILE MATERIALS USING LASER BEAMS AND MATERIAL SIZED IN LARGER WIDTHS

CROSS REFERENCE TO RELATED APPLICATIONS

This application claims priority to U.S. Provisional Application No.: 60/338,488 filed Nov. 3, 2001.

BACKGROUND OF INVENTION

Our patents and copending applications have described how laser beams may be used to process materials in order to change the look of those materials. For example, our U.S. Pat. No. 5,990,444 teaches a way in which the density of applied laser energy per each unit time ("EDPUT") of the output of a laser can be controlled to change the look of a material, without actually unintentionally damaging the material. The surface characteristics and hence look of the material may be changed by this processing without burning through or otherwise unintentionally damaging the material. Our other patent applications also describe user interfaces that can be used to form various features on the material. By appropriate selection of the way that a numerically controlled laser is driven, it becomes possible to form new designs on the material which have not been previously possible to form.

Other patent applications, and patents describe special designs that can be formed.

The present application describes processing these materials in bulk. In an embodiment, a conveyor concept of processing materials of this type may be extended to form special kinds of materials and material handling techniques in a way such that standard sized textile materials, typically formed on textile rolls, can be processed in bulk.

SUMMARY OF INVENTION

The present application teaches a number of techniques associated with processing the material in bulk, and after such processing, using the material to form final products.

The present application teaches different size rolls of conventional sizes, current textile sizes of which may include 60 inches, 62 inches, 70 inches, 72 inches and 108 inches, and other conventional sizes, can be processed as a single unit. Different techniques are disclosed, including handling the current textile width, as well as different conveyor systems which can be used for this textile.

A process of scan and index is disclosed, in which either a rectangular section or a square section can be processed. The technique of forming panels can be used to form different types of panels.

A process of scribing on-the-fly is also described.

Different applications are described for this system.

Another technique describes a digital process that can uniquely change the processing on-the-fly.

BRIEF DESCRIPTION OF DRAWINGS

These and other aspects will now the described in detail with reference to the accompanying drawings, wherein.

DETAILED DESCRIPTION

Figure 1:
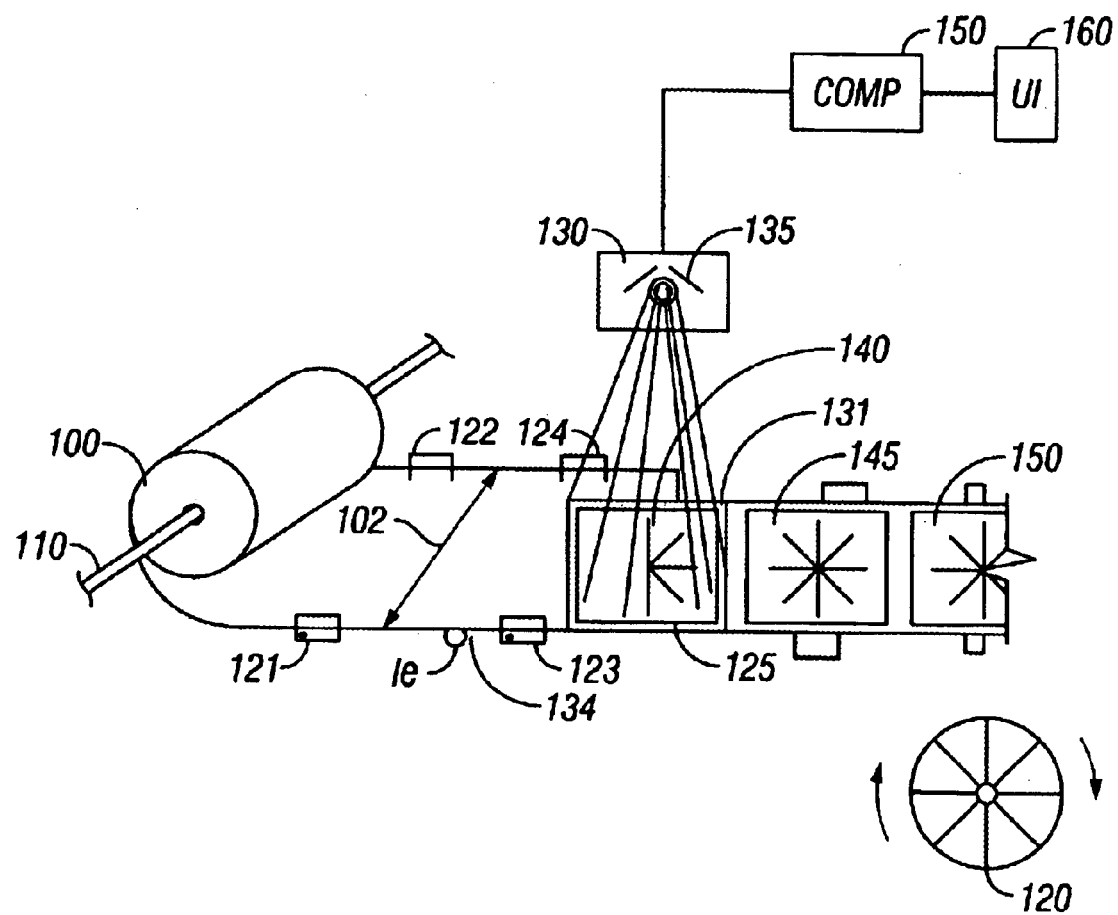
FIG. 1 shows a first embodiment of a conveyor system according to the present application.

An embodiment is shown in FIG. 1, including a conveyor which may be used to form different kinds of apparel and materials for use in apparel.

The conveyor is shown in FIG. 1 includes a numerically controlled laser which operates to form patterns on bulk textiles. Specified patterns are described as being formed. However, it should be understood that other patterns can alternatively be formed, and in the embodiment disclosed herein, the specific disclosed patterns which are disclosed can also be formed on other textiles including pre cut (non-bulk) textiles. The basic first embodiment of the conveyor is shown in FIG. 1. FIG. 1 shows a roll of material 100, where the roll is a conventional size roll of material having a size 102 of conventional width. The width is greater than 50 inches, preferably greater than 55 inches, and is preferably one of the "standard" material widths of 60 inches, 62 inches, 70 inches, or another standard width.

The roll rotates on the rotation device 110 and is pulled by the take up reel 120. Alternatively, a more active driving mechanism like a motor may be provided as part of 110. The roll is unrolled as material web 115, which is guided to the lasing area 125 where the material will be lased by the laser beam. The material web is lased at full width, that is the laser operates to form the pattern over the entire desired part of the standard width of 60 inches or the like.

The laser operates as described in our U.S. Pat. No. 5,990,444, and specifically to change the look of the material at desired locations according to control signals that are formed as a digital file that drives the laser. This means, of course, that the laser need not process every location of the material. In fact, many times the pattern will be formed by the interaction between the lased portions of the material, which have been lased to produce color changes, and the un lased portion of the material which may stay its original color. In addition, it may be desired to leave a small margin of some desired size of un lased material around the edges of the material web.

The laser 130 is controlled by a computer shown as 150. The computer may be suitably controlled according to a user interface 160, which may run programs as disclosed in our other applications.

The material web is guided to and by edge guides shown as 121, 122, 123, 124, which align the edges of the material with the desired area that corresponds to the lasing area. The material is eventually guided to the lasing area which is adjacent numerically controlled laser 130 which includes mirrors and/or optics 135 that can guide the output of the laser beam to a number of different locations. The laser beam can be scanned over the entire width of the material but it may be desirable to leave a small border area shown as 130 around the edge of the material. The "entire width of the material therefore may include that border. Alternatively, the laser beam can be guided to the entire surface of the material, e.g. the entire 60 inch width. In this embodiment, the material is indexed, that is, it is moved in stages, and then stopped to allow lasing to occur. The lasing may occur over a 60 by 60 square. Therefore, the material is indexed by 60 inches each time it is moved. The material may be brought to rest in the area shown.

The laser beam forms the 60×60 basic pattern unit shown as 140. After lasing, the material is then indexed. The already lased units such as 145, 150 are advanced towards the take up roll 120. Each time the material is indexed, another unit of material is brought to the active area 125.

The basic material units can be any kind of design, including any of the designs described herein or the designs described in our copending applications and previous patents, including a simulated sandblasted design, a fractal design, or any other design that can be defined as a computer file.

The above embodiment has described a process of lase and index. An alternative embodiment may use a continuous feed technique. Also, since the laser beam is capable of numerical controlled scanning to a width of 60 inches, it may also be capable of scanning to a length of 60 inches. Therefore, scanning of a square pattern may be used. However, a rectangular pattern may also be formed using this technique.

The guides 121 and 124 may maintain the material in the desired location for lasing. In addition, a sensor 134, which may be an infrared sensor or an optical sensor, may be located in a location to sense whether the material is misaligned. Misalignment of the material may trigger an alarm that may stop the conveyor and allow the operator and opportunity to manually reconfigure the material.

Figure 2:
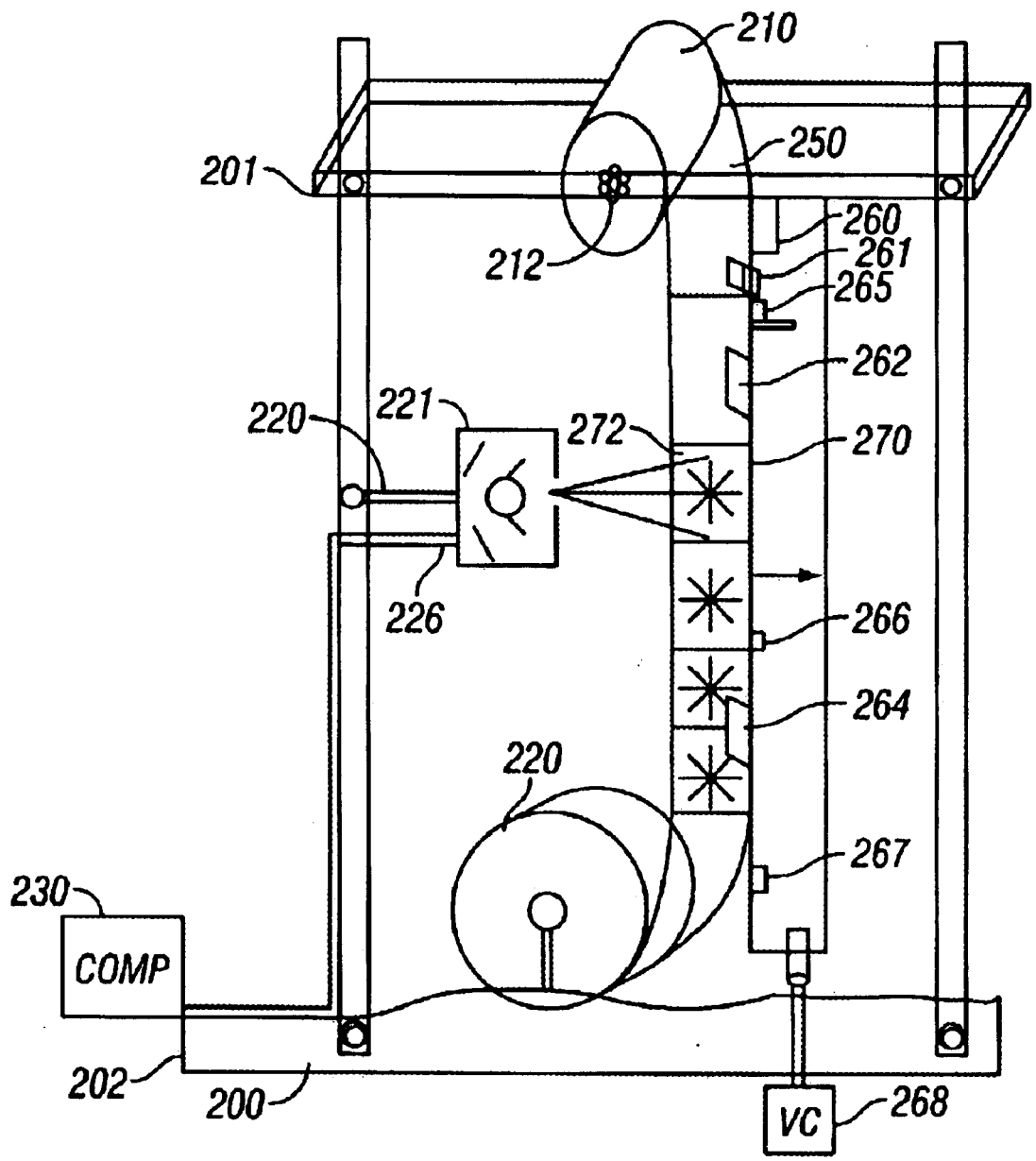
FIG. 2 shows a vertical conveyor system.

This embodiment discloses forming the material and forming the conveyor such that the material is conveyed in a horizontal direction. An alternative embodiment shown in FIG. 2 may save on floor space by forming the conveyor in a way where the material is conveyed vertically. The embodiment of FIG. 2 is formed on a special frame shown as 200. The frame 200 includes the basic top piece 201 and bottom piece 202. The top piece 201 includes a cross frame structure that holds the unmarked material roll 210. The material roll 210 is allowed to rotate on a roll holder 212. As in the first embodiment, tension may be placed on this roll in order to keep the web tight at all locations. The take up reel 220 is motorized, and held on the bottom support structure 202. A center support structure 220 may hold the numerically controlled laser apparatus 224.

The laser 224 is controlled by a control line 226, which can be for example a network cable carrying data from a computer 230 which is remotely located relative to the laser. The web of material 250 is conveyed along the surface formed by support structure 260. Support structure 260 may also include guides 262, 264 as in the first embodiment. In addition, support structure 260 may include elements which attract the material web 250, to hold the material against the surface 261. In one embodiment, this can be formed by a light vacuum, with holes shown as 265, 266 which are periodically located along the surface 261. A light vacuum force may be applied to the center of the structure 260 by the vacuum pump 268. Other techniques may be used to hold the material edge against the surface 261, including electrostatic attraction, or different kinds of force. Preferably the clamps only clamp the edges, to avoid the clamp leaving a residue on the material or a shadow of the way or the laser was unable to lase around the clamp.

In operation, material from the roll 210 is unrolled as web 250. This is brought to the area of the laser beam 224, shown as the active area 270. The laser beam may form a pattern on the material shown as unit pattern 272. In this embodiment, the unit pattern is continuous, with no spaces between the different units that are formed. The unit pattern is formed, and eventually appears on the material on the take up roll 220. As in the first embodiment, this system may also include optical sensors that sense the position of the material on the web to prevent errors.

In addition more than one type of pattern may be formed on the same roll. For example, the computer may instruct that 900 of the specified kinds of unit patterns be first formed. Then, another 900 of the second kind of unit pattern can be formed.

Figure 3:
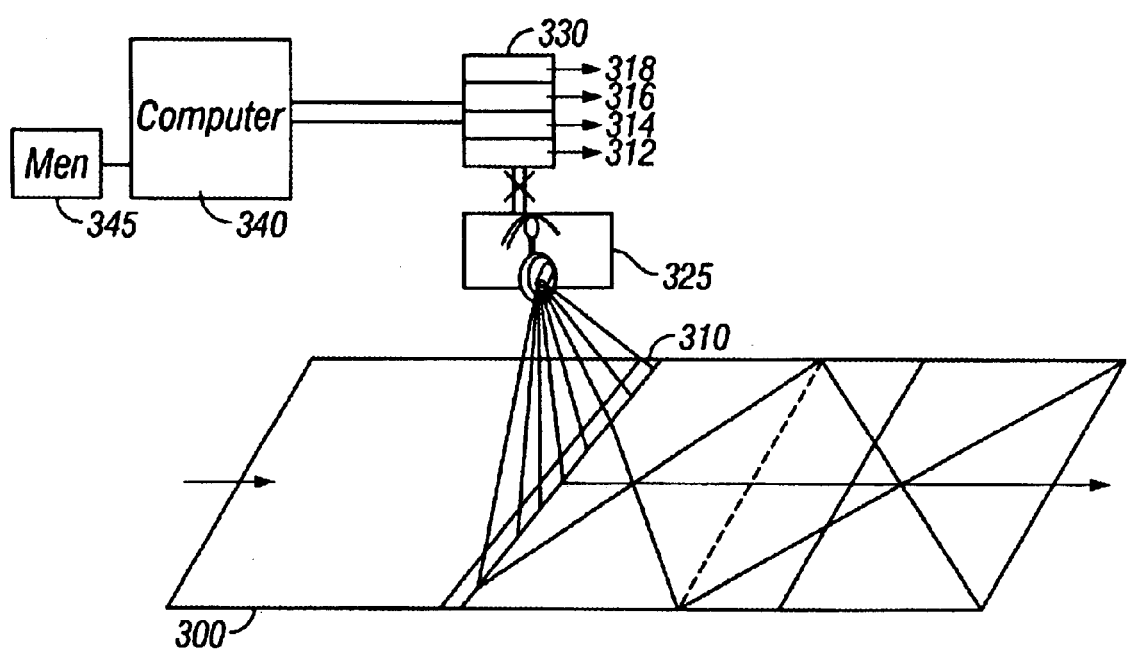
FIG. 3 shows a way in which scribe and index techniques may be used to form a panel that can be cut to form an item of apparel.

The above has described the index and lase mode in which the material is indexed, held in position, and scribed while in position. The alternative mode is illustrated in FIG. 3 which shows scribing "on-the-fly". In this embodiment, the material edge 300 is continually moving. However, the movement of the material web is slow relative to the movement of the laser beam. At each location of movement, the laser beam scribes a one "pixel" wide swath of the pattern shown as 310. The term pixel is used herein to represent the narrowest width element that the laser beam can form; and may simply mean the way that the laser beam forms a unit element. In this way, the pattern is substantially continuously formed, one pixel wide at a time. The laser beam may be controlled to move much faster than the movement of the material, so that the pattern does not appear to 'smear". However, this requires some sophistication. Either the computer must be able to provide the instructions for each pixel wide swath very quickly, or alternatively, the computer may download a plurality of different instructions which are streamed in advance. While the instructions describing line 310 are being executed, the instructions for lines 312, 314, 316, 318 may be stored in a working memory 330. These instructions are effectively streamed in advance into the working memory 330. The laser beam 32S continually looks to the memory 330 in order to obtain its next set of instructions. In this way, the software instructions are streamed n advance, and this enables the material to be continually lased. This system may produce advantages especially in a continuously formed pattern.

Figure 4:
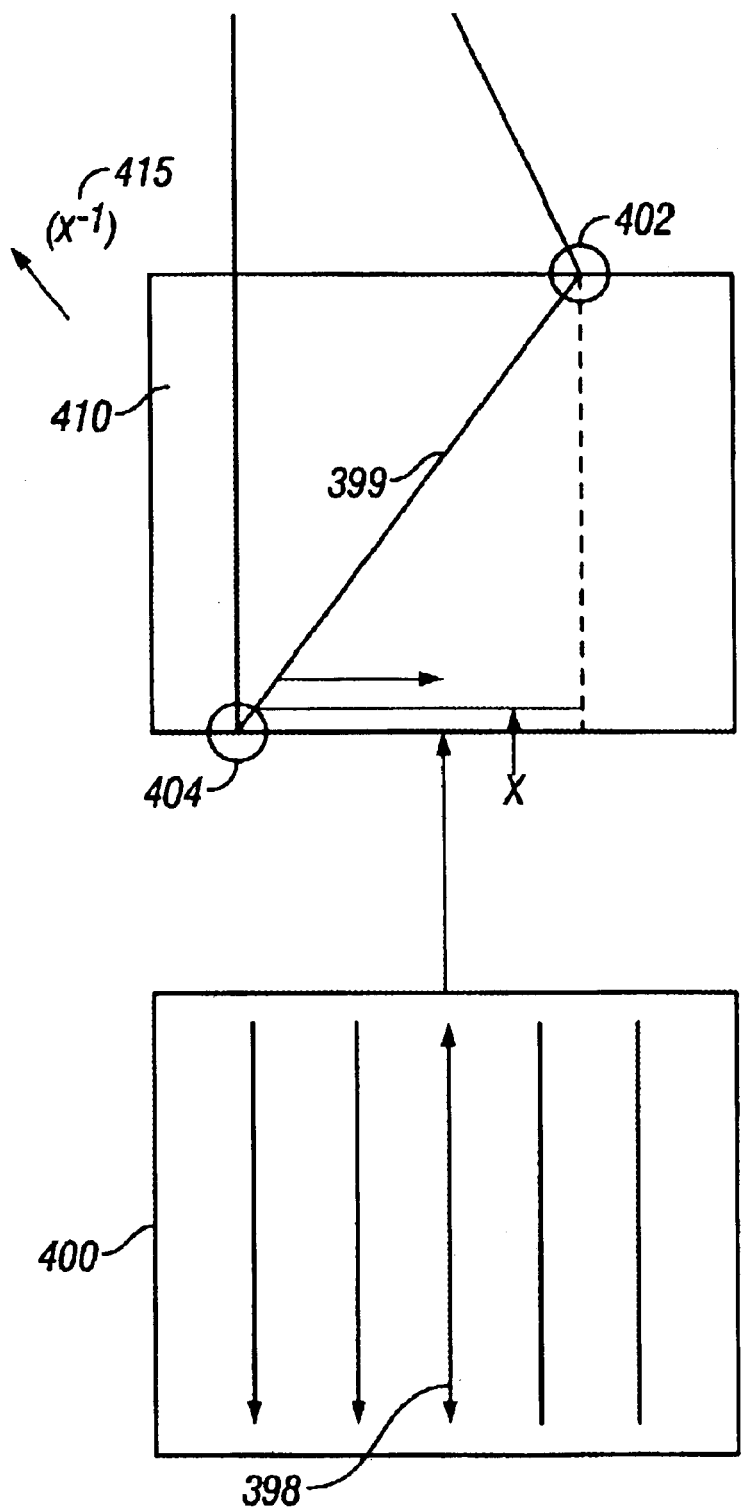
FIG. 4 diagrams compensation for movement of the conveyor during laser operations.

In another modification, it may be recognized that the laser might not be traveling fast relative to the conveyor. This could cause smear in the image. Accordingly, this system may compensate for the speed of the Web relative to the speed of the laser. Say that one wants to form the pattern shown as 400 in FIG. 4. This pattern is simply a set of vertical lines along with the surface of the web. However, this will be formed while the web is moving. If the patterns are formed from top to bottom, then the web will have moved some amount between the time that 402 is formed, and the time that 404 is formed. The value x is determined as the amount that the web will move in the time it takes the laser beam to scan from 402 to 404. Since this is linear, (assuming that the web moves at a linear pace), a linear function can be defined which defines the angle of this line 399 in order that corresponds to the real and desired straight line 398. Thus, the system identifies the distortion in the image that will be formed, and compensates the image prior to applying it to the computer. The inverse of the image 410 is taken shown as 415, and applied to the computer. By driving the laser beam with its inverse 415, the speed of the laser may be compensated in the final formed product.

Applications of this system may include any of the devices for materials shown above, and can be used for auto interiors such as trunk and liner panels, home furnishings, any marine application, upholstery for a vehicle including airlines, and the like. Many different systems are described in our patents and co pending applications for using a laser to form of multiple different effects on materials. These effects maybe formed on materials that are being laser machined "in bulk", i.e. materials which are machines in large rolls, such as 60 inch roles, or the like. Many different effects are known and described.

Figure 5:
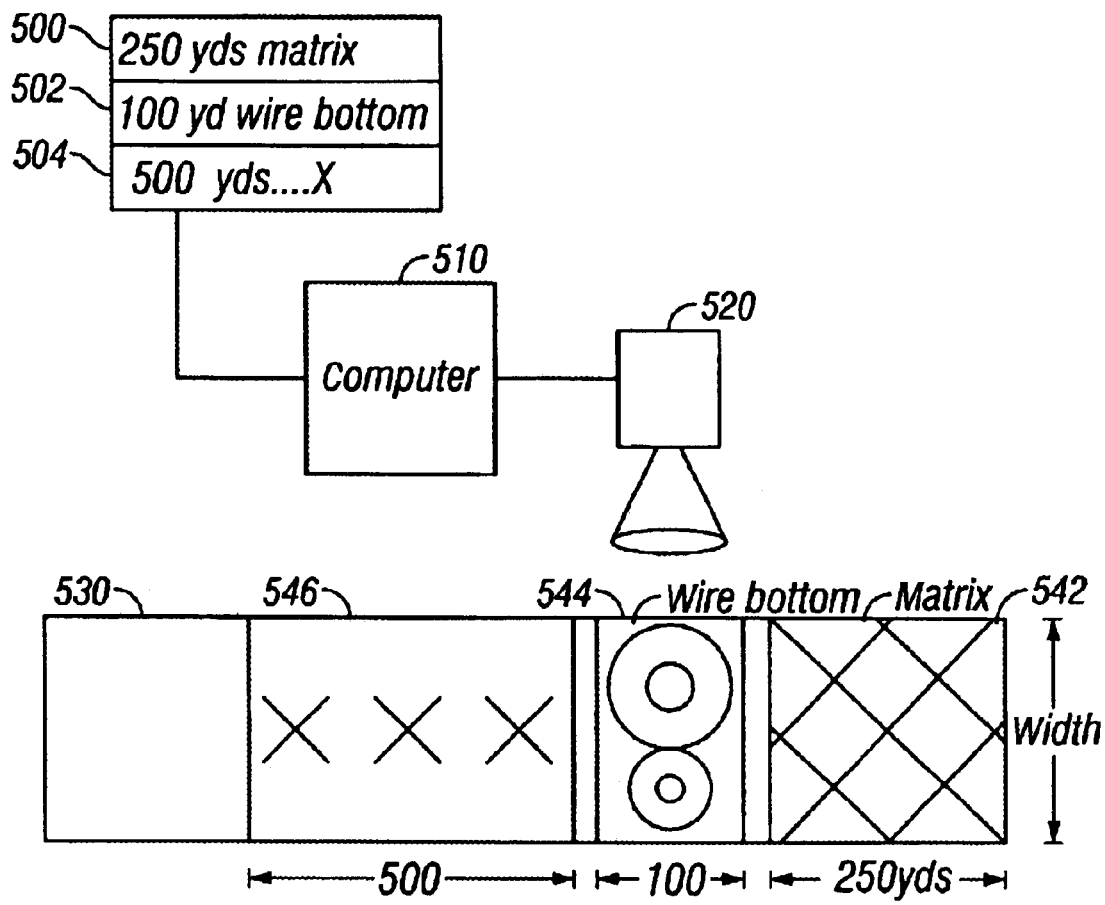
FIG. 5 shows a system which allows formation of different patterns on a single continuous roll of material.

The system as described herein also enables special advantages which are not possible using conventional techniques. In this embodiment, the pattern is stored in a memory 345 that is associated with the computer 340. This memory may store information about running lengths of patterns. These patterns that may differ within the overall pattern. For example, the memory may store, as shown in FIG. 5, a first file part 500 which indicates 250 yards of the pattern called matrix. The next file in the memory may indicate 100 yards of the pattern called wire bottom in 352. The next length 354 may be 500 yards of the pattern called x. This information is read by the computer 510 and the information is sent to computer 510, and from computer 510 is sent to a numerically controlled laser, of the type described in our previous patents.

This numerically controlled laser may lase patterns onto the material by controlling the energy density per unit time, in a way that does not undesirably damage the material.

The result of lasing the shown as the material web 530. This one continuous web, which may be a 60 inch or greater width material of any textile, but preferably denim, has a 250 yard section of matrix shown as 542, 100 yards section of wine bottom shown as 544, and 500 yard section of pattern x. This may be especially important since certain patterns may need to be lased in certain directions. One such effect, is an effect of local abrasion. Local abrasion is often formed, as explained in our U.S. Pat. No. 6,002,099 by going over different areas multiple times in order to increase the intensity of the effect. This is often done by forming two or more different images and driving the laser with those images to change the look of the material.

In this embodiment, the inventors recognized that if the scribing were done in two separate passes, the resulting pattern could look unnatural at overlap where the material was hit by the laser twice. Accordingly, in this embodiment, the two patterns are fused into a single composite image.

The image is used to drive the laser. A laser is used which has the capability of changing its output power density per-unit time and unique area, in the middle of each scan line. The composite image therefore drives the laser according to one or multiple images which are mathematically added. In another embodiment, the area of overlap between different parts of the image may also be modified to follow a Gaussian, for example.

Any number of different patterns can be continuously formed on the same roll. The process is usually defined in the memory, and this system can uniquely change the pattern on-the-fly.

The above has described the digital information being stored in the memory associated with computer 510. This digital information can be stored in any form, and specifically can be stored as either raster information, or as vector information. In the case of raster information, the pattern will be lased by the numerically controlled laser moving back and forth as commanded by the raster information. In the case of vector information, the software instructions take into account the specific shape or shapes of the pattern to be formed, which are defined as vector objects. The vector information may be more appropriate for the first embodiment in which the material is indexed, lased and then indexed.

Figure 8A:
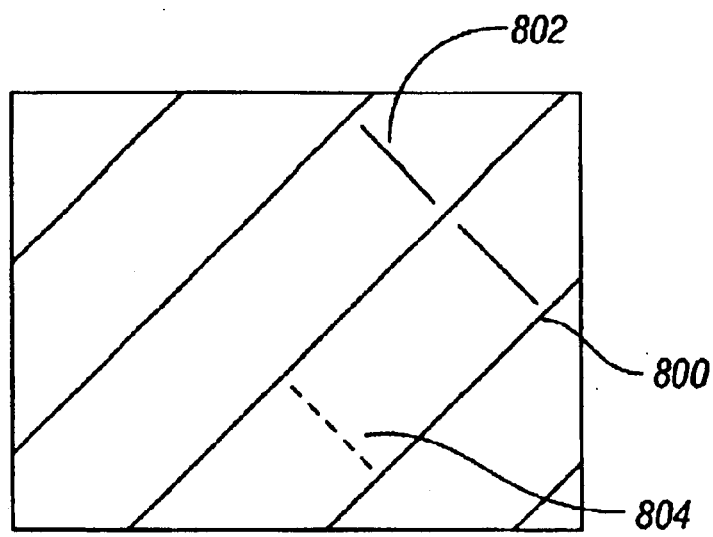
FIGS. 8A–8C show formation of different effects on specified materials.
Figure 8B:
Figure 8C:
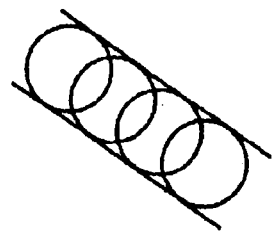

Another aspect which is extremely important is the aspect of twills. Many different materials, including conventional denim, has twills when the fabric is weaved. These twills are effectively ridges in the material which are all parallel and all extend in substantially the same direction. Other materials, referred to herein as crosshatched fabrics, extend in both directions. In one embodiment, the materials can be formed by replicating a crosshatch on the material itself. For example, this may follow the technique shown in FIGS. 8A–C. FIG. 8A shows a twilled fabric, with the twill lines 800 extending across the fabric. This may be for example on a roll or the like. Also on, the roll, the present system uses a laser to mark cross lines. Alternatively, or in addition to the cross lines, this system may be used to mark dots or dashes in an opposite direction to the twill. This can be used to form a crosshatched material. Other materials, such as the velvet or others can be marked in a similar way using a laser. When materials such as velvet are used, often the lines may take the form of the dots in 804. Even when a line is formed, however, that line is really formed of a number of dots. If the material is looked at closely, it actually looks like the representation in FIG. 8, where the dots as being formed by the laser. In an embodiment, the lines per inch are compressed so that the dots overlap by for example one-third of their diameter. This forms the line shown in FIG. 8C, which is representative of the new marking.

In this case, the laser can freely move relative to the material in any desired way. In a second embodiment in which continuous movement is carried out, a raster scan may be more advantageous.

By forming materials in this way, it becomes possible to produce new materials at relatively low-cost, which are different then any previously-formed materials. Examples of these new materials may include a 60 by 60 wall hanging formed of denim. This wall hanging is lased to include a specified pattern. The pattern may be formed as one large pattern, and then sold as basically a tapestry to appear on the user's wall. The wall hanging may include any of the patterns described in our other applications and patents, including random patterns, tiled patterns, fractal patterns, or textual patterns to include a few.

Some patterns require washing, others not. The system may use an in-line rinsing station.

In addition, both this and other materials may include additive materials of the type that changes their look. For example, the materials may include a glow in the dark type substance called Optiglo. This may cause the materials to glow. The Optiglo material may be selectively absorbed by different parts of the materials more than others. The absorption of the Optiglo can be based on, for example, the way in which the material is lased. If for example, different types of lasing operations change the surface characteristic, and cause the additive to be absorbed at different rates. This by itself may produce a desired effect.

Figure 6:
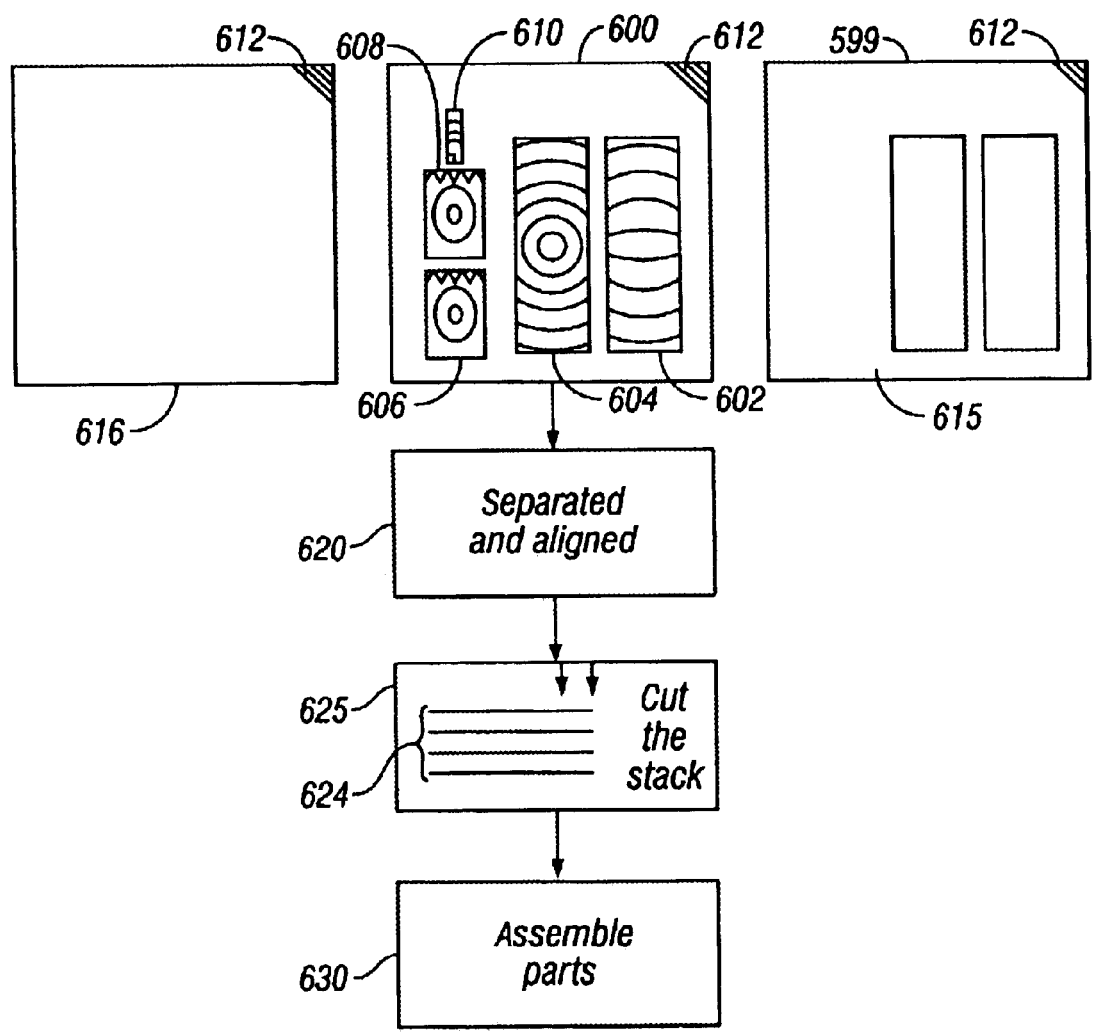
FIG. 6 shows how material can be lased in a way that forms a single garment.

Another advantage of the 60 by 60 frames will be explained relative to FIG. 6. FIG. 6 shows the specific 60 by 60 frames which may be lased; each frame representing a single or multiple pair of apparel. For example, the frame 600 may include for a pair of pants, a rear leg part 602, a front leg part 604, pocket parts 606, 608, belt loops, and all of the other parts which will be sewn together in order to form the final apparel. A number of these panels may be lased; for example FIG. 6 shows three adjacent panels 600,

615, 616. It should be understood that as described above, this kind of panel and any other kind of panel can be lased in a series. A number of these panels may be formed, and each of the panels may also include an alignment indicia shown as 612. The alignment indicia can be simply a pattern part, or could actually be a hole formed through the material. This represents step 599 of the overall process.

After forming these multiple panels, at 620, the panels are separated and aligned at 620. This forms a stack shown generally at 624. At 625, the aligned stack is cut to remove each of the separated portions. Since presumably each of these portions are substantially identical, the portions may simply be assembled at 630 into finished apparel.

For example, this system may be used to form a three-dimensional effect on materials like and including fabrics, formats, velvet and other similar materials. This may use the techniques described above with regard to twills. Moreover, by varying the amount of energy that is applied to the material at any given time, a three-dimensional effect that is controlled by applied energy may be obtained. This is different than anything done in the prior art. For example, the prior art is not capable of forming a three-dimensional effect using conventional printing technology. The present system may be used to form such a three-dimensional effect on materials.

Without meaning to limit this system, it can be used for the following applications.

Reversible Materials This system can be used to form reversible products. For example, a reversible product may be formed by marking a first pattern on a first side of the roll of material. The roll can then be reversed, and a second pattern may be marked on the second side.

KhakisStretch marks have been painted onto such materials. A problem is that over time, the painted on stretch marks may actually crack. This system may use a laser to form a phantom stretch mark by chemically altering the material. In this way, the laser result will not crack over time.

EmbroideryThis system may be used to form embroidery of a specified type. Usually embroidery is formed all the way through a specified material. In this system, the embroidery is formed on one side only. In this way, the user cannot feel the embroidery when it is being worn, since the inside of the material is totally unchanged. However, the outside has parts which are altered in the shape of the embroidery.

Materials can be used not only for formed materials but also for griege goods. Griege goods may be lazed prior to coloring and then the color selected at the end.

GrayscaleIn certain types of material, including certain fabrics, the color is adopted depending on how the material is wove. For example, the grayscale may change the color. This system may be used on bulk rolls for example.

This technique may be used with any of the previously-described techniques which is included but not limited to formation of fractal patterns on textiles. Another embodiment of his system relates specifically to the kinds of patterns which can be formed using the digital technique. One of the advantages of this system is its ability to simulate patterns which are otherwise formed using manual processes. As described in our previous applications, many previous systems used sandblasting which was carried out by a user holding a sandblast gun, and pointing that gun directly at the denim material. Other techniques have been carried out using hand sanding, where a worker actually sands patterns by hand into the material. Other techniques, called "whisker-shapes" have been formed by tracing a tool across apparel, and causing that tool to make whisker shaped patterns on the material.

One embodiment of this application relates to the way in which these otherwise naturally formed patterns can be re-formed in the digital domain. One aspect relates to forming these patterns in reverse. An aspect described herein forms marking patterns which are a digital pattern that is added to the actual pattern to be formed. This marking pattern is then used to modify the original image and formed an image on the textile material which corresponds to a combination of the original image and the marking pattern. Examples of marking patterns are provided herein.

Figure 7A:
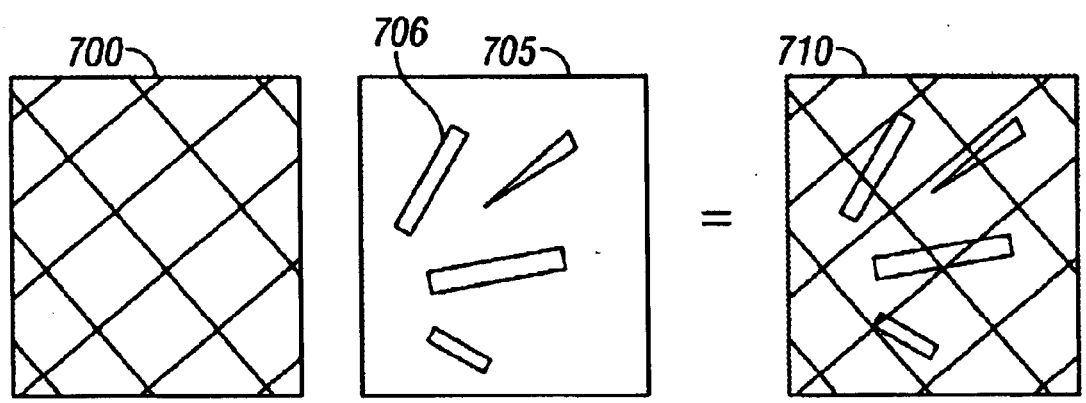
FIGS. 7A–7B show specific patterns formed using digital enhancement techniques.
Figure 7B:
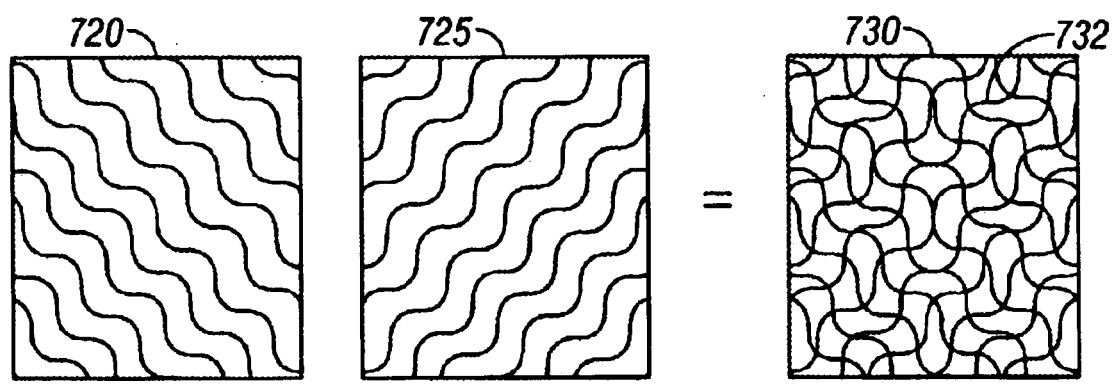

FIG. 7A–7C relates to the way in which the materials may be formed. In FIG. 7A, a pattern 700 is intended to be formed, using techniques that will simulate hand standing. When the inventors investigated hand sanding techniques, they found image parts that look like white lines, going through the patterns. These white lines were formed by the hand sanding and the way it left marks on the material.

In this embodiment, the pattern may be modified to include some of these noise lines that are often left by hand sanding. The pattern 700 corresponds to the original pattern to be formed, which may be, for example, a pattern indicative of sandblasting. Pattern 705 represents a pattern of random white lines such as would be formed by the hand sanding process. Each of the pattern portions such as 706 effectively represents any residue of the pattern at that location. The two patterns, that is the desired pattern 700 and the marking pattern 705 are added together to remove the patterns 705 from the pattern 700. The resultant pattern 710 is formed as a combination of the two, that is desired pattern 700, added to marking pattern 705.

Other patterns which were formed in conventional denim, such as whiskers, can only be formed in one way. In the embodiment shown in FIG. 7B, reverse whiskers may be formed. In FIG. 7B, the whiskers are defined as conventional whisker shapes shown as 725. However, instead of these whiskers being whiskers that formed as usual on the pattern, they may actually be removals from the pattern in a whisker shape. The pattern 720 may represent the desired pattern, which again may include random noise components. The shape of the whiskers 725 is removed from the desired pattern, to form the resultant pattern 730. As such a whisker shaped area is removed from the resultant pattern. These whisker shaped areas are actually blanks in the pattern, and although they are shown in dotted lines in the right most portion of FIG. 7B, in fact they would only be blank areas.

In a similar way, any other feature that is usually formed by a hand formation technique may be formed in reverse or and more generally, in any formation. For example, these may be formed as grayscale images, they may be formed in colored patterns, and the like.

Although only a few embodiments have been disclosed in detail above, other modifications are possible. All such modifications are intended to the be encompassed within the following claims, in which

We claim:

1. A system, comprising:
   a material delivery system, driving and moving material of a first width having a width of at least 50 inches along a first path; and
   a processing laser, located along said first path, and producing an output beam that scans a field size of at least said first width, said output beam processing said material in a way that changes a look of said material along said first width.

2. A system as in claim 1, wherein said material defines a width of at least 55 inches in width.

3. A system as in claim 1, wherein said material defines a width of at least 60 inches in width.

4. A system as in claim 1, wherein said material defines a width of at least 62 inches in width.

5. A system as in claim 1, further comprising a plurality of guides, spaced at edges of said material at least 55 inches away from one another, and guiding said material to said laser beam.

6. A system as in claim 5, wherein said material delivery system includes a system which indexes said material by a specified amount, and then stops said material in a location near said laser beam for a specified amount of time.

7. A system as in claim 5, wherein said material delivery system continually moves said material.

8. A system as in claim 1, further comprising a controller, associated with said laser beam, which controls scanning of said laser beam in a specified way to produce specified patterns on said material.

9. A system as in claim 8, wherein said computer includes a pattern memory associated therewith, storing a specified pattern to be formed on said material.

10. A system as in claim 1, wherein said material deliver system includes a take up roll and a supply roll which are substantially vertical with one another.

11. A system as in claim 9, wherein said computer controls said laser beam to scan according to information in said pattern memory, to form the new patterns of a specified type, each unique pattern formed on said material Web in a way which is adjacent another unit pattern.

12. A system as in claim 11, wherein said unique patterns include a plurality of patterns of the same type.

13. A system as in claim 11, wherein said pattern memory stores information for a plurality of patterns of a specified type, and another plurality of patterns of another specified type.

14. A system as in claim 11, wherein said pattern memory includes instructions for a specified distance of a first type of pattern, and then another specified distance of a second type of pattern.

15. A system as in claim 11, wherein said material is controlled to continuously move.

16. A system as in claim 15, wherein said computer controls said laser beam to scan in a raster fashion while the material continually moves.

17. A system as in claim 15, wherein said computer includes a correction factor which corrects for an amount of movement which occurs while said system is scanning.

18. A system as in claim 17, wherein said laser is caused to raster scan.

19. A system as in claim 11, wherein said laser is caused to move by a specified amount, then stops, then moves again.

20. A system as in claim 19, wherein said laser beam is caused to vector scan in a specified pattern while the pattern device is stopped.

21. A system as in claim 11, wherein said computer streams software instructions in advance.

22. A system as in claim 1, wherein said material Web moves in a horizontal direction.

23. A system as in claim 1, wherein said material Web moves in a vertical direction.

24. A system as in claim 23, further comprising a vertically extending material holding device, holding the material Web according to a specified direction.

25. A system as in claim 16 further comprising a compensation element associated with said pattern memory, operating to compensate for an amount of movement of said material while the device is scanning.

26. A system as in claim 8, wherein said pattern has different parts that respectively represent different parts of an apparel item.

27. A system as in claim 1, wherein said pattern simulates a random pattern.

28. A method, comprising:

unrolling a material from a roll of material which is at least 55 inches wide;

feeding said material along a material web, having a width of at least 55 inches wide, and guiding said material into an area of a laser beam;

lasing said material, using said laser beam, to form a pattern on said material which is at least said 55 inches wide, while said material is moving.

29. A method as in claim 28, wherein said material Web is conveyed in a horizontal direction.

30. A method as in claim 28, wherein said material Web is conveyed in a vertical direction.

31. A method as in claim 28, wherein said lazing comprises forming a plurality of unit patterns, each unit pattern having a specified length, and a width of the least 55 inches.

32. A method as in claim 31, wherein each said unit pattern is substantially square.

33. A method as in claim 31, wherein each said unit pattern is substantially rectangular.

34. A method as in claim 28, wherein said forming a pattern comprises forming a continuous pattern.

35. A method as in claim 28, further comprising controlling said laser beam using a computer which is programmed with a plurality of patterns.

36. A method as in claim 35, further comprising streaming a plurality of different software instructions representing pattern information into said laser beam in advance, and using this scanned pattern information to form said pattern on said material.

37. A method as in claim 28, wherein said material Web is conveyed continuously along said direction, and said laser beam is used to form said pattern while said Web is being continuously conveyed.

38. A method as in claim 37, further comprising analyzing an amount of distortion which will be caused by said material moving between a first part of a laser scanning and a second part of the laser scanning, and compensating for said distortion by changing said pattern.

39. A method as in claim 38, wherein said laser scanning is a raster scanning, and said amount of distortion is an amount of distortion between one side of a raster scanning and another side of the raster scanning.

40. A method as in claim 38, wherein said changing said pattern comprises distorting said pattern according to a negative of said distortion.

41. A method as in claim 28, wherein said material Web is indexed by moving said material Web by a specified amount, and stopping said material Web after moving said specified amount.

42. A method as in claim 41, wherein said stopping occurs for an amount of time which allows said laser beam to write a specified amount of a pattern.

43. A method as in claim 41, wherein said forming a pattern comprises forming a plurality of the unit patterns, each of which is separate, and said stopping occurs for an amount of time which allows said laser beam to write an entire unit pattern.

44. A method as in claim 43, wherein at least one of said unit patterns is different then at least one other of said unit patterns.

45. A method as in claim 44, further comprising storing information about said unit patterns, and an amount of said unit patterns, in a memory, and forming said material Web based on said information into said memory.

46. A method as in claim 44, wherein said unit patterns also include information about a pattern being formed thereby.

47. A method as in claim 46, wherein said pattern forms in different parts of an article of clothing which will be later assembled.

48. A method as in claim 47, wherein said different parts include a pant leg and a pant pocket.

* * * * *